US010929068B2

(12) United States Patent
Ober et al.

(10) Patent No.: US 10,929,068 B2
(45) Date of Patent: *Feb. 23, 2021

(54) PRE-CACHING DATA ACCORDING TO A CURRENT OR PREDICTED REQUESTER LOCATION

(71) Applicant: International Business Machines Corporation, Armonk, NY (US)

(72) Inventors: Brian F. Ober, Lake in the Hills, IL (US); Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/456,633

(22) Filed: Jun. 28, 2019

(65) Prior Publication Data
US 2019/0317669 A1 Oct. 17, 2019

Related U.S. Application Data

(63) Continuation of application No. 15/265,303, filed on Sep. 14, 2016, now Pat. No. 10,558,396.

(51) Int. Cl.
*G06F 3/06* (2006.01)
*G06F 11/10* (2006.01)

(52) U.S. Cl.
CPC .............. *G06F 3/067* (2013.01); *G06F 3/061* (2013.01); *G06F 3/064* (2013.01); *G06F 3/0619* (2013.01); *G06F 11/1076* (2013.01)

(58) Field of Classification Search
CPC ...................................................... G06F 3/067
(Continued)

(56) References Cited

U.S. PATENT DOCUMENTS 4,092,732 A 5/1978 Ouchi
5,454,101 A 9/1995 Mackay et al.
(Continued)

OTHER PUBLICATIONS

Chung; An Automatic Data Segmentation Method for 3D Measured Data Points; National Taiwan University; pp. 1-8; 1998.
(Continued)

*Primary Examiner* — Fritz Alphonse
(74) *Attorney, Agent, or Firm* — James Nock; Andrew D. Wright; Roberts Calderon Safran & Cole, P.C.

(57) ABSTRACT

A computing device includes an interface configured to interface and communicate with a dispersed storage network (DSN), a memory that stores operational instructions, and a processing module operably coupled to the interface and memory such that the processing module, when operable within the computing device based on the operational instructions, is configured to perform various operations. The computing device processes data usage characteristics associated with a data object that is associated with a user to determine an estimated location of the user. When the estimated location of the user compares unfavorably to the home location of the user, the computing device pre-fetches less than the decode threshold number of EDSs, for each set of encoded data slices (EDSs) that respectively correspond to data segments of a data object, from first storage units (SUs) to second SUs associated with the estimated location of the user.

20 Claims, 6 Drawing Sheets

(58) Field of Classification Search
USPC .................................... 714/764, 768, 765
See application file for complete search history.

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,381,221 | B1 * | 4/2002 | Legouet-Camus ....... H04L 1/24 370/217 |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,395,462 | B2 * | 7/2008 | Tseng ................. G11B 20/1816 369/44.25 |
| 7,636,724 | B2 | 12/2009 | de la Torre et al. |
| 8,356,026 | B2 | 1/2013 | Heimendinger |
| 8,880,652 | B2 | 11/2014 | Lam |
| 10,558,396 | B2 * | 2/2020 | Ober ..................... G06F 3/067 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2013/0060786 | A1 | 3/2013 | Serrano et al. |
| 2013/0208893 | A1 | 8/2013 | Shablygin et al. |
| 2013/0212704 | A1 | 8/2013 | Shablygin et al. |
| 2014/0032959 | A1 | 1/2014 | Dawkins et al. |
| 2014/0095943 | A1 | 4/2014 | Kohlenberg et al. |
| 2015/0161360 | A1 | 6/2015 | Paruchuri et al. |
| 2016/0275042 | A1 * | 9/2016 | Pathak .................... H04L 67/42 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

(56) References Cited

OTHER PUBLICATIONS

List of IBM Patents or Patent Applications Treated as Related, dated Sep. 9, 2020, 1 page.

* cited by examiner

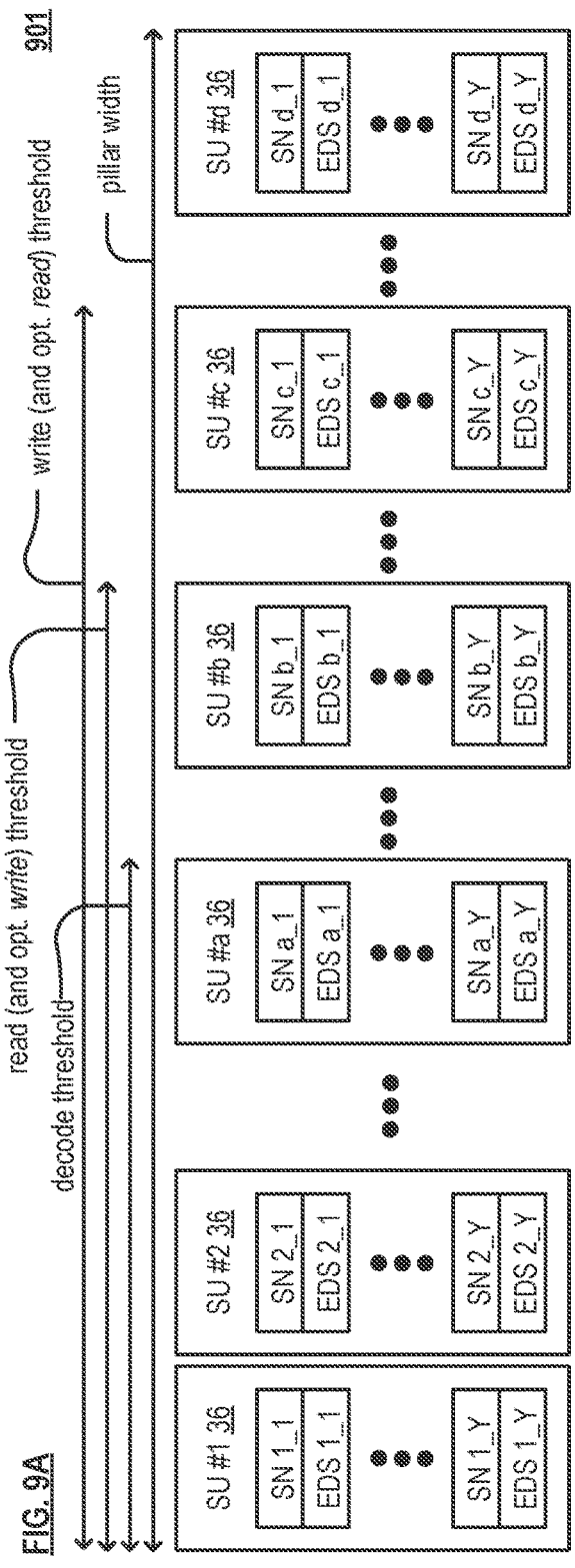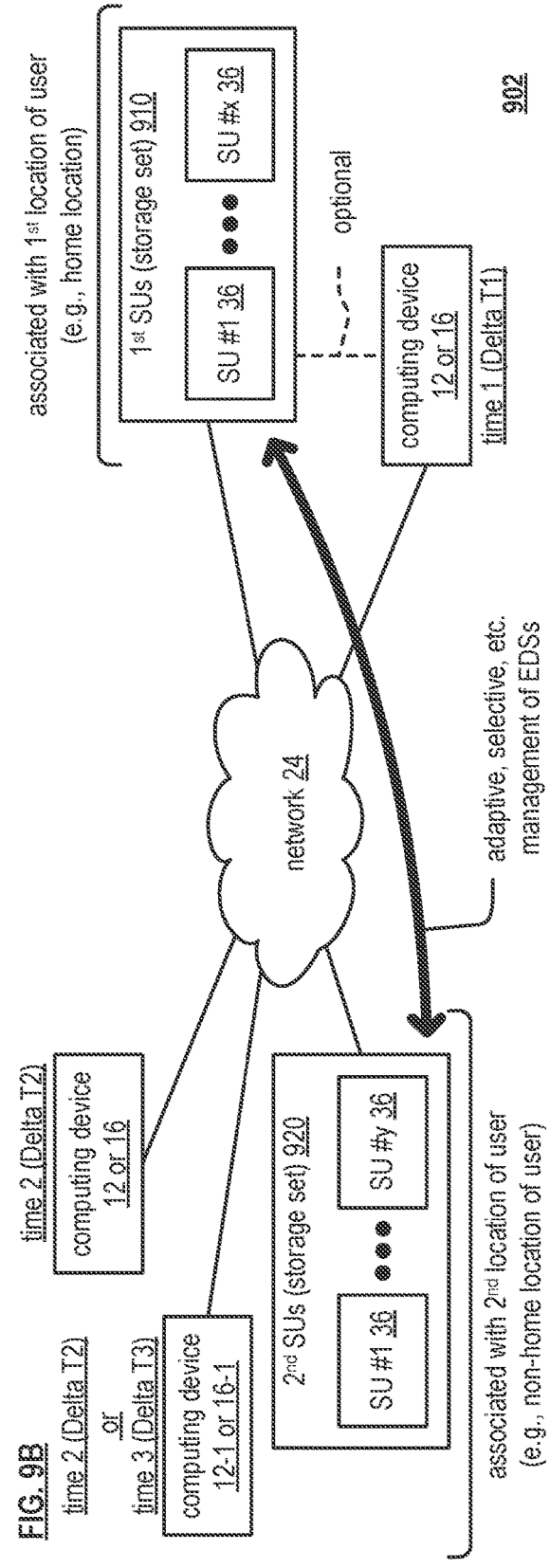

PRE-CACHING DATA ACCORDING TO A CURRENT OR PREDICTED REQUESTER LOCATION

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Users that access data within data storage systems can access such data from different locations at different times and for different reasons. The prior art does not provide an adequate means by which to ensure consistently high servicing of that data for a user when the user may be in different locations including sometimes locations very distant from one another.

BRIEF DESCRIPTION OF THE SEVERAL VIEWS OF THE DRAWING(S)

FIG. 9A is a schematic block diagram of an example of various parameters associated with a set of encoded data slices (EDSs) stored within storage units (SUs) in accordance with the present invention;

FIG. 9B is a schematic block diagram of another embodiment of a dispersed or DSN in accordance with the present invention.

DETAILED DESCRIPTION OF THE INVENTION

Figure 1:
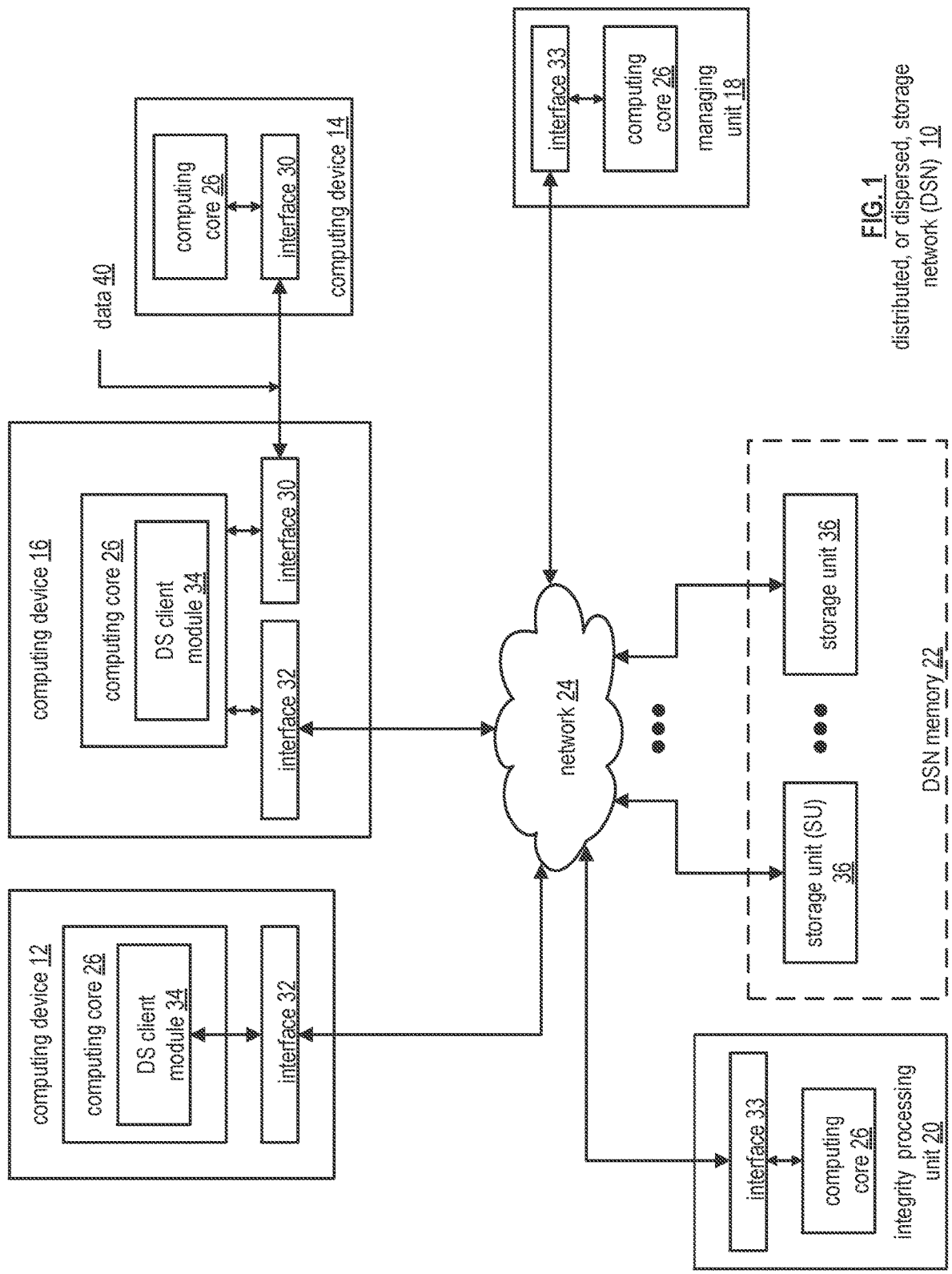
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public interne systems; and/or one or more local area networks (LAN) and/or wide area networks (WAN).

Figure 2:
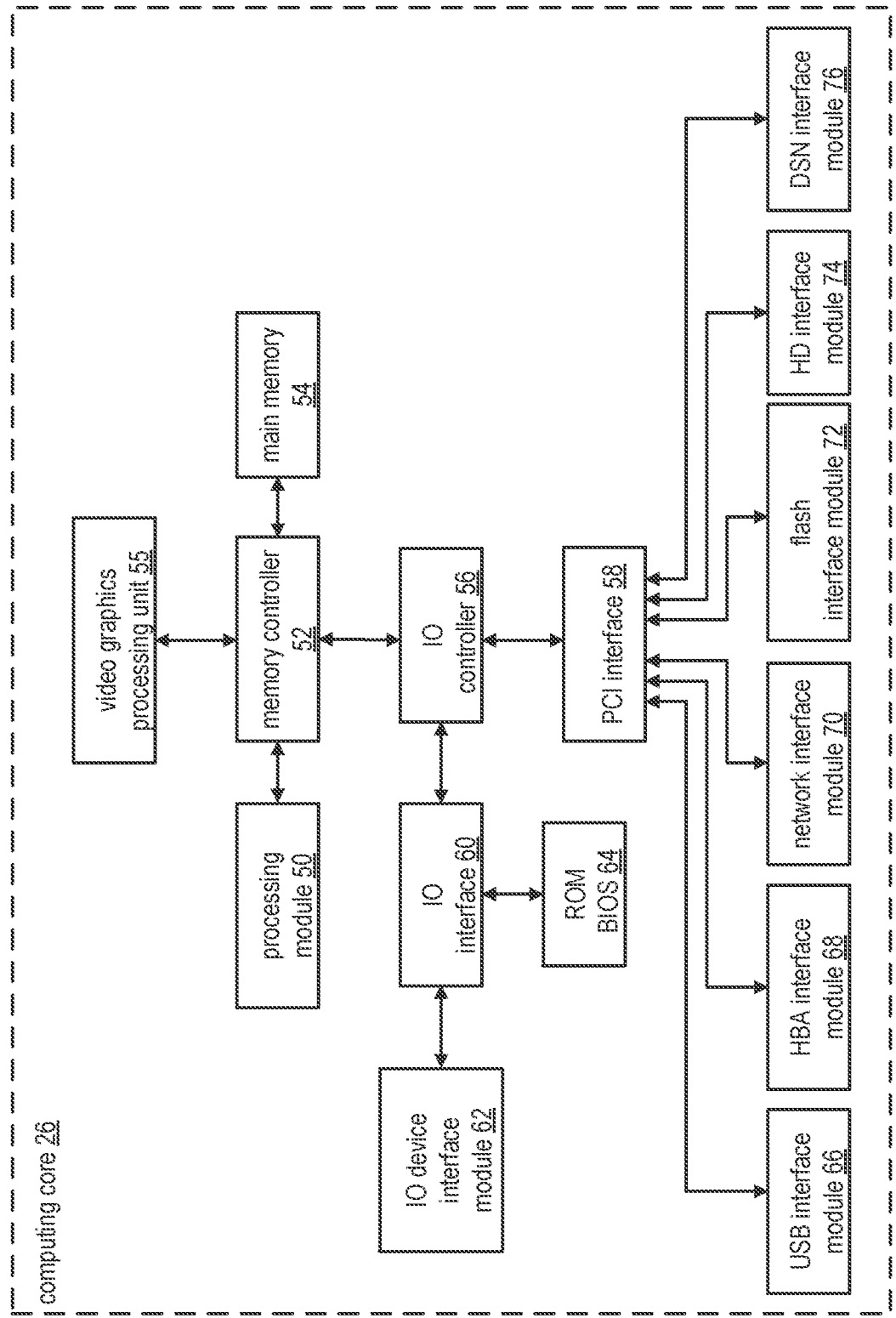
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4, 5, 6:
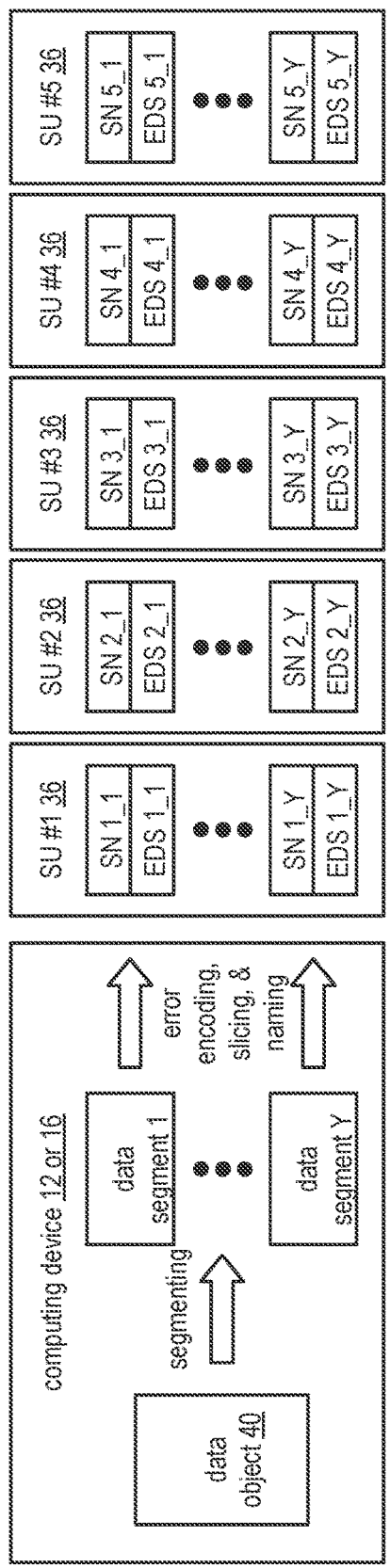
FIG. 3 is a schematic block diagram of an example of dispersed storage error encoding of data in accordance with the present invention.
FIG. 4 is a schematic block diagram of a generic example of an error encoding function in accordance with the present invention.
FIG. 5 is a schematic block diagram of a specific example of an error encoding function in accordance with the present invention.
FIG. 6 is a schematic block diagram of an example of a slice name of an encoded data slice (EDS) in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
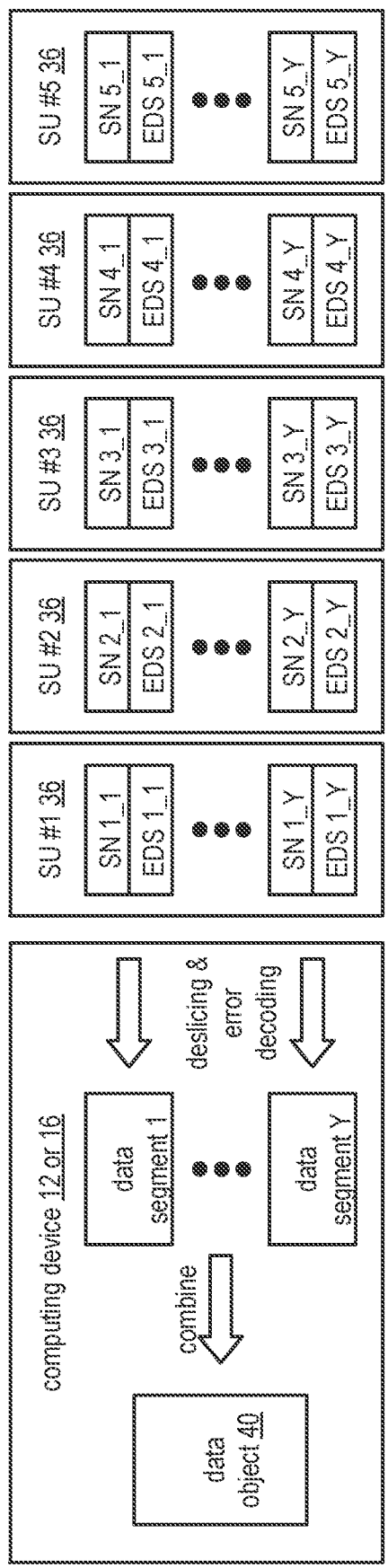
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
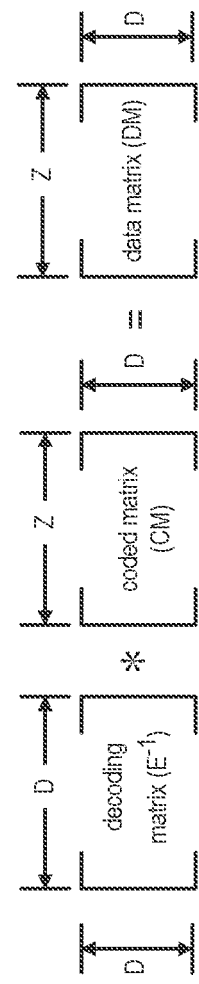
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

FIG. 9A is a schematic block diagram of an example 901 of various parameters associated with a set of encoded data slices (EDSs) stored within storage units (SUs) in accordance with the present invention. This diagram shows generally the relationship between a pillar width number of SUs (and/or EDSs), a decode threshold number of SUs (and/or EDSs), a read threshold number of SUs (and/or EDSs), and a write threshold number of SUs (and/or EDSs). When considering such numbers with respect to EDSs, note that a data object is segmented into data segments, and a data segment of the plurality of data segments is dispersed error encoded in accordance with dispersed error encoding parameters to produce the set of EDSs that is of pillar width. A decode threshold number of EDSs are needed to recover the data segment, a read threshold number of EDSs provides for reconstruction of the data segment, and a write threshold number of EDSs provides for a successful transfer of the set of EDSs from a first at least one location in the DSN to a second at least one location in the DSN. Note also that the read threshold number and the write threshold number may be the same in certain examples and based on certain dispersed error encoding parameters. In general, the read threshold number is greater than the decode threshold number. Also, the write threshold number is generally greater than the read threshold number and less than the pillar width.

Various numbers of EDSs may be pre-fetched, retrieved, etc. from one set of SUs to another set of SUs based on various conditions. For example, management of sets of EDSs for various data segments of a data object may be moved from one set of SUs to another set of SUs based on an estimated location of a user requesting access to the data object (e.g., for read request(s) and/or write request(s)).

FIG. 9B is a schematic block diagram of another embodiment 902 of a dispersed or DSN in accordance with the present invention. A computing device 12 or 16 includes an interface configured to interface and communicate with a dispersed storage network (DSN), a memory that stores operational instructions, and a processing module operably coupled to the interface and memory such that the processing module, when operable within the computing device based on the operational instructions, is configured to perform various operations.

In an example of operation and implementation, the computing device 12 or 16 is associated with a user and located within a $1^{st}$ location (e.g., a home location) at or during a first time. Then, at or during a second time, the computing device 12 or 16 that is associated with the user and located within a $2^{nd}$ location (e.g., a non-home location). Note that there may be situations in which a user accessed the network 24 and/or any other component coupled thereto using entirely different computing devices 12 or 16 at different times and from different locations (e.g., access the network 24 and/or any other component coupled thereto using a first laptop computer or other computing device 12 or 16 in the $1^{st}$ location and access the network 24 and/or any other component coupled thereto using a second laptop computer or other computing device 12-1 or 16-1 in the $2^{nd}$ location). One or more of the computing devices 12 or 16 operates to perform adaptive, selective, etc. management of EDSs associated with different respective set of EDSs associated with corresponding data segments of data objects based on various considerations (e.g., including the location of the user).

In an example, the computing device 12 or 16 processes data usage characteristics associated with a data object that is associated with a user to determine an estimated location of the user. For example, the computing device 12 or 16 may monitor how often a user is accessing the data object (e.g., via write requests and/or read requests), which particular data object(s) among a number of data objects the user is accessing, which particular data object(s) among the number of data objects the user has a history of accessing, which particular data object(s) among the number of data objects the user has an expectation or prediction of accessing, etc. In addition, the computing device 12 or 16 may process historical usages, behaviors, etc. of the user when accessing various types of data object(s). Moreover, the computing device 12 or 16 may process historical usages, behaviors, etc. of the user when accessing various types of data object(s) when the user is located at different respective locations, at certain times, etc.

In general, the computing device 12 or 16 may be implemented to process any information related to data object(s) that are created, read, written, accessed, retrieved, etc. by one or more users (e.g., file type(s) such as data, media such as audio, photo, or video, any associated metadata, frequency of access(es), total number of access(es), access(es) by one or more other users such as who may be authorized by the user, shares of such data such as via one or more social media platforms, etc.).

Note that the data object is segmented into data segments. A data segment of the data segments is dispersed error encoded in accordance with dispersed error encoding parameters to produce a set of encoded data slices (EDSs) that is of pillar width. The set of EDSs are distributedly stored among a first storage units (SUs) 910 associated with a home location of the user. Also, note that a decode threshold number of EDSs is needed to recover the data segment, a read threshold number of EDSs provides for reconstruction of the data segment, and a write threshold number of EDSs provides for a successful transfer of the set of EDSs from a first at least one location in the DSN to a second at least one location in the DSN.

Then, when the estimated location of the user compares unfavorably to the home location of the user (e.g., when it is determined that the user is not in the first location/the home location), for each respective data segment of the data segments, the computing device 12 or 16 pre-fetches less than the decode threshold number of EDSs for each respective data segment of the data segments that are needed to recover each respective data segment of the data segments of the data object from the first SUs 910 associated with the home location of the user for storage in the memory of the computing device and/or second SUs 920 associated with the estimated location of the user. Note that the first SUs 910 may be in one location, and the second SUs 920 may be in another location. In an example, the first SUs 910 may be in California, and the second SUs 920 may be in Florida.

When a write request and/or a read request for the data object is received from the user, retrieve at least one remaining EDS for each respective data segment of the data segments of the data object from the first SUs 910 associated with the home location of the user for storage in the memory and/or the second SUs 920 associated with the estimated location of the user so that at least the decode threshold number of EDSs is included within the memory and/or the second SUs 920 associated with the estimated location of the user.

In some examples, when the write request and/or the read request for the data object is received from the user, the computing device 12 or 16 retrieves the at least one remaining EDS for each respective data segment of the data segments of the data object from the first SUs 910 associated with the home location of the user for storage in the memory and/or the second SUs 920 associated with the estimated location of the user so that at least one of read threshold number of EDSs or the write threshold number of EDSs are included within the at least one of the memory or the second SUs 920 associated with the estimated location of the user.

In some examples, the computing device 12 or 16 processes other data usage characteristics associated with data objects associated with the user to identify a first subset of the data objects that are associated with the user that have a higher probability of use by the user than a second subset of the data objects that is associated with the user when the user is determined to be in the estimated location. Then, the computing device 12 or 16 retrieves a first number of EDSs for each respective data segment of a first data segments of a first data object within the first subset of the data objects from the first SUs 910 associated with the home location of the user for storage in the at least one of the memory or the second SUs 920 associated with the estimated location of the user. The computing device 12 or 16 then retrieves a second number of EDSs that is less than the first number of EDSs for each respective data segment of a second data segments of a second data object within the second subset of the data objects from the first SUs 910 associated with the home location of the user for storage in the at least one of the memory or the second SUs 920 associated with the estimated location of the user.

In some examples, for each respective data segment of a first subset of the data segments, the computing device 12 or 16 processes pre-fetches less than the decode threshold number of EDSs for each respective data segment of the first subset of the data segments that are needed to recover each respective data segment of the first subset of the data segments of the data object from the first SUs 910 associated with the home location of the user for storage in the memory of the computing device 12 or 16. Also, for each respective data segment of a second subset of the data segments, the computing device 12 or 16 processes pre-fetches than the decode threshold number of EDSs for each respective data segment of the second subset of the data segments that are needed to recover each respective data segment of the second subset of the plurality of data segments of the data object from the first SUs 910 associated with the home location of the user for storage in the second SUs 920 associated with the estimated location of the user. Then, when a write request and/or a read request for the data object is received from the user, the computing device 12 or 16 retrieves at least one remaining EDS for each respective data segment of the data segments of the data object from the first SUs 910 associated with the home location of the user for storage in the memory and/or the second SUs 920 associated with the estimated location of the user so that at least the decode threshold number of EDSs is included within the memory and/or the second SUs 920 associated with the estimated location of the user.

In one specific example, the first number of EDSs includes approximately 70% of the decode threshold number of EDSs, and the second number of EDSs includes approximately 30% of the decode threshold number of EDSs. In another specific example, the first number of EDSs includes approximately 50% of the decode threshold number of EDSs, and the second number of EDSs includes approximately 50% of the decode threshold number of EDSs. In yet another specific example, the first number of EDSs includes approximately 30% of the decode threshold number of EDSs, and the second number of EDSs includes approximately 70% of the decode threshold number of EDSs. In general, any desired numbers of EDSs may be used for both the first number of EDSs and the second number of EDSs without departing from the scope and spirit of the invention.

In another example of operation, when the estimated location of the user compares unfavorably to the home location of the user, the for each respective data segment of the data segments, the computing device 12 or 16 pre-fetches the less than the decode threshold number of EDSs for each respective data segment of the data segments that are needed to recover each respective data segment of the data segments of the data object from the first SUs associated with the home location of the user. Then, the computing device 12 or 16 stores a first subset of the less than the decode threshold number of EDSs for each respective data segment of the data segments that are needed to recover each respective data segment of the data segments of the data object in the second SUs 920 associated with the estimated location of the user. The computing device 12 or 16 then also stores a second subset of the less than the decode threshold number of EDSs for each respective data segment of the data segments that are needed to recover each respective data segment of the data segments of the data object in the memory.

Note that the computing device 12 or 16 may be located in any location within the DSN including at a first premises that is remotely located from at least one SU of the first SUs 910 or the second SUs 930 within the DSN. Note also that the computing device 12 or 16 may be any type of devices a described herein and/or any of their equivalents including a SU of the first SUs 910 or the second SUs 920 within the DSN, a wireless smart phone, a laptop, a tablet, a personal computers (PC), a work station, or a video game device. Note also that the DSN may be implemented with and/or include any type(s) of communication systems including a wireless communication system, a wire lined communication systems, a non-public intranet system, a public internet system, a local area network (LAN), and/or a wide area network (WAN).

Figure 10:
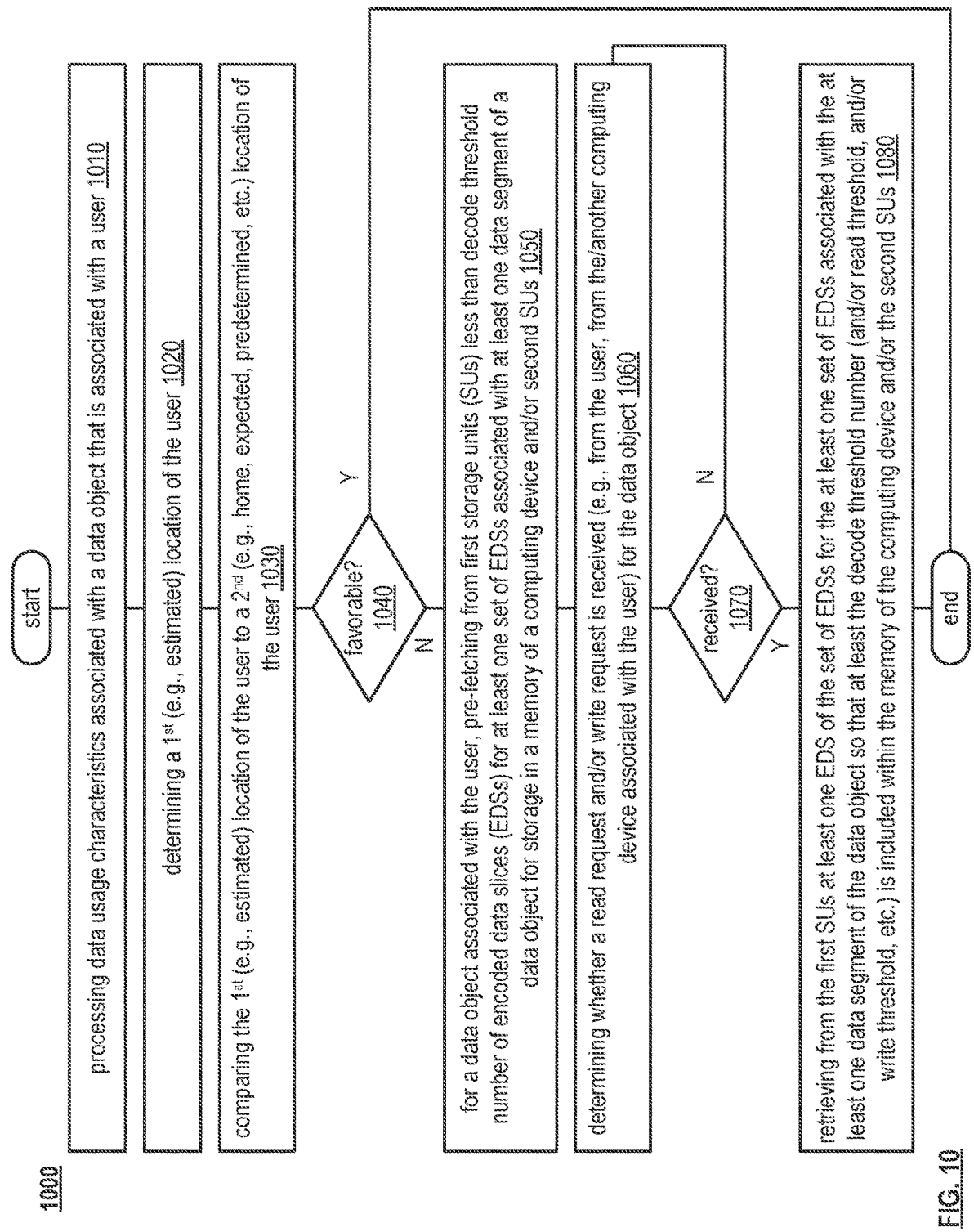
FIG. 10 is a diagram illustrating an embodiment of a method for execution by one or more computing devices in accordance with the present invention.

FIG. 10 is a diagram illustrating an embodiment of a method for execution by one or more computing devices in accordance with the present invention. The method 1000 begins in step 1010 by processing data usage characteristics associated with a data object that is associated with a user to determine an estimated location of the user. Note that the data object is segmented into data segments, and a data segment of the data segments is dispersed error encoded in accordance with dispersed error encoding parameters to produce a set of encoded data slices (EDSs) that is of pillar width. Also, the set of EDSs are distributedly stored among a first storage units (SUs) associated with first location (e.g., a home location) of the user within a dispersed storage network (DSN). Note also that a decode threshold number of EDSs are needed to recover the data segment, a read threshold number of EDSs provides for reconstruction of the data segment, and a write threshold number of EDSs provides for a successful transfer of the set of EDSs from a first at least one location in the DSN to a second at least one location in the DSN.

The method 1000 continues in step 1020 by determining a first location of the user. For example, this first location may be a home location of the user. Note that a home location of a user may be viewed as being a location of the user for a certain period of time (e.g., a certain number of minutes, hours, days, months, etc. and/or any other period of time) or a location that the user oftentimes is located. Note also that the location of the user may be understood with respect to a particular region (e.g., a location defined as anywhere within a city block, a location defined as anywhere within a home, a location defined as anywhere within an apartment building, a location defined as anywhere within a particular circle on the Earth having a specified center and a radius of X meters where X is a positive number, a location defined as anywhere within a particular square or rectangle on the Earth having a specified center and length (square) or length and width (rectangle), and/or any other shape or type of region on Earth as may be desired or specified, etc.). Note that the user may have a first home location at or during a first time and a second home location at or during a second time.

When the estimated location of the user compares favorably to the home location of the user in step 1040, the method 1000 ends. Alternatively, when the estimated location of the user compares unfavorably to the home location of the user in step 1040, then for each respective data segment of the data segments, the method 1000 operates in step 1050 by pre-fetching less than the decode threshold number of EDSs for each respective data segment of the data segments that are needed to recover each respective data segment of the data segments of the data object from the first SUs associated with the home location of the user for storage in a memory of the computing device and/or a second SUs associated with the estimated location of the user.

Then, the method 1000 operates by determining whether a read request and/or a write request for the data object in step 1060. The read request and/or the write request for the data object may be received from the user, from computing device or another computing device associated with the user, etc.).

When no read request and/or write request has been received in step 1070, the method 1000 loops back to step 1060. Alternatively, when read request and/or write request has been received in step 1070, then the method 1000 operates by retrieving at least one remaining EDS for each respective data segment of the data segments of the data object from the first SUs associated with the home location of the user for storage in the at least one of the memory of the computing device or the second SUs associated with the estimated location of the user so that at least the decode threshold number of EDSs is included within the at least one of the memory of the computing device or the second SUs associated with the estimated location of the user.

In an example of operation and implementation, a computing device (e.g., a DS processing unit, or any other unit operating within a DSN memory) can be implemented to use techniques for determining where a user/requester is or is likely to be in the near future. For example, based on an access history (e.g., data usage characteristics), this computing device may also determine which particular data the user/requester will most likely access and take preparatory steps to make the data access more efficient. For example, one or more computing devices (e.g., DS processing unit(s), or any other unit(s) operating within the DSN memory) in close proximity to the user/requester may pre-fetch certain data in anticipation of that user/requester needing to access that data in the near term. Data with a high access probability may correspond to top levels of the index, data associated with the applications the user/requester frequently uses, content in the user/requester's "home directory", etc. Similarly, this data may be pro-actively migrated or transferred to physical storage units (SUs) in closer proximity to the user/requester or to a vault representing the regional location (or one close to) the user/requester's location. For example, if a unit in the DSN memory determines the user/requester is on a trip from one location to another (e.g., from California to Florida) and has been there for a certain period to time (e.g., a several days, several weeks, etc.) the one or more computing devices may transition some or all of the data in the vault from California-based SUs to Florida-based SUs that are closer to the new or updated location of the user/requester. Based on the determined location of the user/requester, a DS processing unit may also "redirect" a user/requester's request to a DS processing unit determined to be "more local" to the user/requester, thereby reducing access time and latency.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
   an interface configured to interface and communicate with a dispersed storage network (DSN);
   memory that stores operational instructions; and
   a processing module operably coupled to the interface and to the memory, wherein the processing module, when operable within the computing device based on the operational instructions, is configured to:
   process data usage characteristics associated with a data object that is associated with a user to determine an estimated location of the user, wherein the data object is segmented into a plurality of data segments, wherein a data segment of the plurality of data segments is dispersed error encoded in accordance with dispersed error encoding parameters to produce a set of encoded data slices (EDSs) that is of pillar width, wherein the set of EDSs are distributedly stored among a first plurality of storage units (SUs) associated with a home location of the user, wherein a decode threshold number of EDSs are needed to recover the data segment; and
   based on the estimated location of the user comparing unfavorably to the home location of the user, for each respective data segment of the plurality of data segments, pre-fetch less than the decode threshold number of EDSs for the each respective data segment of the plurality of data segments that are needed to recover the each respective data segment of the plurality of data segments of the data object from the first plurality of SUs associated with the home location of the user for storage in at least one of the memory or a second plurality of SUs associated with the estimated location of the user to be used in combination with at least one remaining EDS for the each respective data segment of the plurality of data segments of the data object to be retrieved from the first plurality of SUs associated with the home location in accordance with at least one of a write request or a read request for the data object from the user.

2. The computing device of claim 1, wherein the processing module, when operable within the computing device based on the operational instructions, is further configured to:
based on the at least one of the write request or the read request for the data object is received from the user, retrieve at least one remaining EDS for the each respective data segment of the plurality of data segments of the data object from the first plurality of SUs associated with the home location of the user for storage in the at least one of the memory or the second plurality of SUs associated with the estimated location of the user so that at least the decode threshold number of EDSs is included within the at least one of the memory or the second plurality of SUs associated with the estimated location of the user.

3. The computing device of claim 1, wherein the processing module, when operable within the computing device based on the operational instructions, is further configured to:
based on the at least one of the write request or the read request for the data object is received from the user, retrieve the at least one remaining EDS for the each respective data segment of the plurality of data segments of the data object from the first plurality of SUs associated with the home location of the user for storage in the at least one of the memory or the second plurality of SUs associated with the estimated location of the user so that at least one of a read threshold number of EDSs or a write threshold number of EDSs are included within the at least one of the memory or the second plurality of SUs associated with the estimated location of the user, wherein a read threshold number of EDSs provides for reconstruction of the data segment, wherein a write threshold number of EDSs provides for a successful transfer of the set of EDSs from a first at least one location in the DSN to a second at least one location in the DSN.

4. The computing device of claim 1, wherein the processing module, when operable within the computing device based on the operational instructions, is further configured to:
process other data usage characteristics associated with a plurality of data objects that is associated with the user to identify a first subset of the plurality of data objects that is associated with the user that have a higher probability of use by the user than a second subset of the plurality of data objects that is associated with the user based on the user determined to be in the estimated location;
retrieve a first number of EDSs for each respective data segment of a first plurality of data segments of a first data object within the first subset of the plurality of data objects from the first plurality of SUs associated with the home location of the user for storage in the at least one of the memory or the second plurality of SUs associated with the estimated location of the user; and
retrieve a second number of EDSs that is less than the first number of EDSs for each respective data segment of a second plurality of data segments of a second data object within the second subset of the plurality of data objects from the first plurality of SUs associated with the home location of the user for storage in the at least one of the memory or the second plurality of SUs associated with the estimated location of the user.

5. The computing device of claim 4, wherein:
the first number of EDSs includes approximately 70% of the decode threshold number of EDSs; and
the second number of EDSs includes approximately 30% of the decode threshold number of EDSs.

6. The computing device of claim 1, wherein the processing module, when operable within the computing device based on the operational instructions, is further configured to:
based on the estimated location of the user comparing unfavorably to the home location of the user, for the each respective data segment of the plurality of data segments:
pre-fetch the less than the decode threshold number of EDSs for the each respective data segment of the plurality of data segments that are needed to recover the each respective data segment of the plurality of data segments of the data object from the first plurality of SUs associated with the home location of the user; and
store a subset of the less than the decode threshold number of EDSs for the each respective data segment of the plurality of data segments that are needed to recover the each respective data segment of the plurality of data segments of the data object in the second plurality of SUs associated with the estimated location of the user.

7. The computing device of claim 6, wherein the processing module, when operable within the computing device based on the operational instructions, is further configured to:
store another subset of the less than the decode threshold number of EDSs for the each respective data segment of the plurality of data segments that are needed to recover the each respective data segment of the plurality of data segments of the data object in the memory.

8. The computing device of claim 1, wherein the computing device is located at a first premises that is remotely located from at least one SU of the first plurality of SUs or the second plurality of SUs within the DSN.

9. The computing device of claim 1 further comprising:
a SU of the first plurality of SUs or the second plurality of SUs within the DSN, a wireless smart phone, a laptop, a tablet, a personal computers (PC), a work station, or a video game device.

10. The computing device of claim 1, wherein the DSN includes at least one of a wireless communication system, a wire lined communication system, a non-public intranet system, a public internet system, a local area network (LAN), or a wide area network (WAN).

11. A method for execution by a computing device, the method comprising:
processing data usage characteristics associated with a data object that is associated with a user to determine an estimated location of the user, wherein the data object is segmented into a plurality of data segments, wherein a data segment of the plurality of data segments is dispersed error encoded in accordance with dispersed error encoding parameters to produce a set of encoded data slices (EDSs) that is of pillar width, wherein the set of EDSs are distributedly stored among a first plurality of storage units (SUs) associated with a home location of the user, wherein a decode threshold number of EDSs are needed to recover the data segment; and based on the estimated location of the user comparing unfavorably to the home location of the user, for each respective data segment of the plurality of data segments, pre-fetching, via an interface of the computing device that is configured to interface and communicate with a dispersed storage network (DSN), less than the decode threshold number of EDSs for the each respective data segment of the plurality of data segments that are needed to recover the each respective data segment of the plurality of data segments of the data object from the first plurality of SUs associated with the home location of the user for storage in at least one of a memory of the computing device or a second plurality of SUs associated with the estimated location of the user to be used in combination with at least one remaining EDS for the each respective data segment of the plurality of data segments of the data object to be retrieved from the first plurality of SUs associated with the home location in accordance with at least one of a write request or a read request for the data object from the user.

12. The method of claim 11 further comprising:
based on the at least one of the write request or the read request for the data object is received from the user, retrieving at least one remaining EDS for the each respective data segment of the plurality of data segments of the data object from the first plurality of SUs associated with the home location of the user for storage in the at least one of the memory of the computing device or the second plurality of SUs associated with the estimated location of the user so that at least the decode threshold number of EDSs is included within the at least one of the memory of the computing device or the second plurality of SUs associated with the estimated location of the user.

13. The method of claim 11 further comprising:
based on the at least one of the write request or the read request for the data object is received from the user, retrieving the at least one remaining EDS for the each respective data segment of the plurality of data segments of the data object from the first plurality of SUs associated with the home location of the user for storage in the at least one of the memory of the computing device or the second plurality of SUs associated with the estimated location of the user so that at least one of a read threshold number of EDSs or a write threshold number of EDSs are included within the at least one of the memory of the computing device or the second plurality of SUs associated with the estimated location of the user, wherein a read threshold number of EDSs provides for reconstruction of the data segment, wherein a write threshold number of EDSs provides for a successful transfer of the set of EDSs from a first at least one location in the DSN to a second at least one location in the DSN.

14. The method of claim 11 further comprising:
processing other data usage characteristics associated with a plurality of data objects that is associated with the user to identify a first subset of the plurality of data objects that is associated with the user that have a higher probability of use by the user than a second subset of the plurality of data objects that is associated with the user based on the user determined to be in the estimated location;

retrieving a first number of EDSs for each respective data segment of a first plurality of data segments of a first data object within the first subset of the plurality of data objects from the first plurality of SUs associated with the home location of the user for storage in the at least one of the memory of the computing device or the second plurality of SUs associated with the estimated location of the user; and retrieving a second number of EDSs that is less than the first number of EDSs for each respective data segment of a second plurality of data segments of a second data object within the second subset of the plurality of data objects from the first plurality of SUs associated with the home location of the user for storage in the at least one of the memory of the computing device or the second plurality of SUs associated with the estimated location of the user.

15. The method of claim 14, wherein:
the first number of EDSs includes approximately 70% of the decode threshold number of EDSs; and
the second number of EDSs includes approximately 30% of the decode threshold number of EDSs.

16. The method of claim 11 further comprising:
based on the estimated location of the user comparing unfavorably to the home location of the user, for the each respective data segment of the plurality of data segments:
pre-fetching the less than the decode threshold number of EDSs for the each respective data segment of the plurality of data segments that are needed to recover the each respective data segment of the plurality of data segments of the data object from the first plurality of SUs associated with the home location of the user; and
storing a subset of the less than the decode threshold number of EDSs for the each respective data segment of the plurality of data segments that are needed to recover the each respective data segment of the plurality of data segments of the data object in the second plurality of SUs associated with the estimated location of the user.

17. The method of claim 16 further comprising:
storing another subset of the less than the decode threshold number of EDSs for the each respective data segment of the plurality of data segments that are needed to recover the each respective data segment of the plurality of data segments of the data object in the memory of the computing device.

18. The method of claim 11, wherein the computing device is located at a first premises that is remotely located from at least one SU of the first plurality of SUs or the second plurality of SUs within the DSN.

19. The method of claim 11, wherein the computing device includes a SU of the first plurality of SUs or the second plurality of SUs within the DSN, a wireless smart phone, a laptop, a tablet, a personal computers (PC), a work station, or a video game device.

20. The method of claim 11, wherein the DSN includes at least one of a wireless communication system, a wire lined communication system, a non-public intranet system, a public internet system, a local area network (LAN), or a wide area network (WAN).

* * * * *